US008503622B2

(12) United States Patent
Berstis et al.

(10) Patent No.: US 8,503,622 B2
(45) Date of Patent: Aug. 6, 2013

(54) SELECTIVELY RETRIEVING VOIP MESSAGES

(75) Inventors: Viktors Berstis, Austin, TX (US); Randolph M. Forlenza, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1709 days.

(21) Appl. No.: 11/532,118

(22) Filed: Sep. 15, 2006

(65) Prior Publication Data
US 2008/0069310 A1 Mar. 20, 2008

(51) Int. Cl.
*H04M 1/64* (2006.01)

(52) U.S. Cl.
USPC .................................. 379/88.17; 379/88.22

(58) Field of Classification Search
USPC ........................................... 379/88.17–88.25
See application file for complete search history.

(56) References Cited

U.S. PATENT DOCUMENTS

| | | | |
|---|---|---|---|
| 4,468,813 A | 8/1984 | Burke et al. | |
| 5,146,502 A | 9/1992 | Davis | |
| 5,699,409 A | 12/1997 | Kojima | |
| 5,990,933 A | 11/1999 | Ozone et al. | |
| 6,058,389 A | 5/2000 | Chandra et al. | |
| 6,353,660 B1 * | 3/2002 | Burger et al. | 379/88.17 |
| 6,865,398 B2 | 3/2005 | Mangal et al. | |
| 6,925,605 B2 | 8/2005 | Bates et al. | |
| 7,007,085 B1 * | 2/2006 | Malik | 709/224 |
| 7,032,030 B1 * | 4/2006 | Codignotto | 709/246 |
| 7,123,695 B2 | 10/2006 | Malik | |
| 7,243,060 B2 | 7/2007 | Atlas et al. | |
| 7,599,354 B2 * | 10/2009 | Bratt et al. | 370/352 |
| 7,716,479 B2 * | 5/2010 | Vargas et al. | 713/170 |
| 7,738,638 B1 | 6/2010 | Henderson | |

(Continued)

FOREIGN PATENT DOCUMENTS

EP 1039728 A1 9/2000

OTHER PUBLICATIONS

ICQ/, "ICQ: Voice Message—Plugin", May 8, 1999.
Rose Vines, " ICQ: a user's guide", Dec. 19, 2002.

(Continued)

*Primary Examiner* — Joseph T Phan
(74) *Attorney, Agent, or Firm* — Garg Law Firm, PLLC; Rakesh Garg; Mark C. Vallone (57) ABSTRACT

Methods and arrangements to selectively retrieve Voice over Internet Protocol (VoIP) messages are contemplated. Embodiments include transformations, code, state machines or other logic to selectively retrieve VoIP messages by storing the VoIP messages, associating one or more descriptors with the VoIP messages, and displaying at least some of the VoIP messages. The display may include one or more of the descriptors associated with the displayed VoIP messages. The embodiments may include receiving a designation of a designated VoIP message from the VoIP messages. The embodiments may include retrieving the designated VoIP message. In some embodiments, the designated VoIP message may be played. In further embodiments, the designated VoIP message may be forwarded. In many embodiments, the descriptors associated with the displayed VoIP messages may consist of values of attributes of the displayed VoIP messages. In several embodiments, the attributes may have been received through a user interface. In some embodiments, the displaying may include receiving a change in state of a mouse button. In many embodiments, the designating may include receiving a change in state of a mouse button while a location of a pointer driven by the mouse is associated with the designated VoIP message.

17 Claims, 6 Drawing Sheets

U.S. PATENT DOCUMENTS

| | | | |
|---|---|---|---|
| 7,856,088 B2* | 12/2010 | Janssen | 379/88.22 |
| 7,869,579 B2 | 1/2011 | Kwon | |
| 2001/0012286 A1* | 8/2001 | Huna et al. | 370/352 |
| 2002/0032870 A1* | 3/2002 | Spusta et al. | 713/201 |
| 2003/0035412 A1 | 2/2003 | Wang et al. | |
| 2003/0212553 A1 | 11/2003 | Tsoi et al. | |
| 2003/0215078 A1* | 11/2003 | Brahm et al. | 379/211.02 |
| 2003/0219104 A1 | 11/2003 | Malik | |
| 2003/0235407 A1 | 12/2003 | Lord | |
| 2004/0001482 A1 | 1/2004 | Yeom | |
| 2004/0109023 A1 | 6/2004 | Tsuchiya | |
| 2004/0186887 A1 | 9/2004 | Galli et al. | |
| 2004/0225502 A1 | 11/2004 | Bear et al. | |
| 2005/0027802 A1 | 2/2005 | Madsen et al. | |
| 2005/0041786 A1 | 2/2005 | Craig | |
| 2005/0107071 A1 | 5/2005 | Benco et al. | |
| 2005/0144247 A1* | 6/2005 | Christensen et al. | 709/207 |
| 2005/0159833 A1* | 7/2005 | Giaimo et al. | 700/94 |
| 2005/0209932 A1 | 9/2005 | Hui | |
| 2005/0210394 A1 | 9/2005 | Crandall et al. | |
| 2005/0259638 A1* | 11/2005 | Burg | 370/352 |
| 2006/0010222 A1 | 1/2006 | Cleron et al. | |
| 2006/0029195 A1* | 2/2006 | Mullis et al. | 379/88.17 |
| 2006/0174207 A1 | 8/2006 | Deshpande | |
| 2006/0212291 A1 | 9/2006 | Matsuo | |
| 2006/0256771 A1* | 11/2006 | Yarlagadda | 370/352 |
| 2006/0291580 A1 | 12/2006 | Horvitz | |
| 2007/0036292 A1 | 2/2007 | Selbie et al. | |
| 2007/0071206 A1 | 3/2007 | Gainsboro et al. | |
| 2007/0112925 A1 | 5/2007 | Malik | |
| 2007/0121966 A1 | 5/2007 | Plastina et al. | |
| 2007/0192427 A1 | 8/2007 | Berstis et al. | |
| 2007/0274293 A1 | 11/2007 | Forbes | |
| 2007/0299657 A1 | 12/2007 | Kang et al. | |
| 2008/0037725 A1 | 2/2008 | Berstis et al. | |
| 2008/0065735 A1 | 3/2008 | Szeto et al. | |
| 2008/0107045 A1 | 5/2008 | Berstis et al. | |
| 2008/0222536 A1 | 9/2008 | Berstis et al. | |

OTHER PUBLICATIONS

ICQ, "ICQ: The User Menu", Aug. 15, 2000.
http://www.google.com/talk/, "Google Talk—Talk and IM with your friends for free", p. 1.

* cited by examiner

SELECTIVELY RETRIEVING VOIP MESSAGES

FIELD

The present invention is in the field of the audio communications over a network. More particularly, the present invention relates to methods and arrangements to selectively retrieve VoIP messages.

BACKGROUND

Voice over Internet Protocol (VoIP) is a method for the real-time exchange of speech and other audio over the Internet and other networks. Audio may be converted into digital form, broken up into units of data called packets, and transmitted across a network. Upon receipt, the packets are assembled, and the audio may be converted from digital form to analog form and played.

VoIP calls may be made by several methods. In one method, a call is placed from a standard telephone which is connected to a computer with an analog telephone adapter. The adapter converts sound into digital form for transmission over a network. In a second method, a call is made from an IP phone. The IP phone may convert audio to digital form. The IP phone may connect directly to an Ethernet port for transmission of the digital audio across a network. A third method is from a computer. The computer may include equipment for processing sound, such as a microphone to capture sound, a sound card to convert the sound to digital form, and speakers to play the sound. The computer may be connected to a network for transmission of the sound.

VoIP calls may be made in several settings. A VoIP call may be limited to one participant at each end. A VoIP call may be a conference call, with multiple participants. In addition, a VoIP call may be part of a chat conference. Chat conferences are the real-time exchange of text among groups of people.

Under current VoIP systems, retrieval of VoIP calls, for replaying or forwarding, may be difficult or impossible. In some systems, calls may be automatically deleted once they are received or placed. In other systems, the calls may be retained but may be difficult or impossible to retrieve.

SUMMARY OF THE INVENTION

The problems identified above are in large part addressed by methods and arrangements to selectively retrieve Voice over Internet Protocol (VoIP) messages. One embodiment provides a method to selectively retrieve VoIP messages. The method may involve storing the VoIP messages, associating one or more descriptors with the VoIP messages, and displaying at least some of the VoIP messages. The display may include one or more of the descriptors associated with the displayed VoIP messages. The method may include receiving a designation of a designated VoIP message from the VoIP messages. The method may include retrieving the designated VoIP message.

BRIEF DESCRIPTION OF THE DRAWINGS

Advantages of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to selectively retrieve Voice over Internet Protocol (VoIP) messages are contemplated. Embodiments include transformations, code, state machines or other logic to selectively retrieve VoIP messages by storing the VoIP messages, associating one or more descriptors with the VoIP messages, and displaying at least some of the VoIP messages. The display may include one or more of the descriptors associated with the displayed VoIP messages. The embodiments may include receiving a designation of a designated VoIP message from the VoIP messages. The embodiments may include retrieving the designated VoIP message. In some embodiments, the designated VoIP message may be played. In further embodiments, the designated VoIP message may be forwarded. In many embodiments, the descriptors associated with the displayed VoIP messages may consist of values of attributes of the displayed VoIP messages. In several embodiments, the attributes may have been received through a user interface. In many embodiments, the displaying may include receiving a change in state of a mouse button. In some embodiments, the designating may include receiving a change in state of a mouse button while a location of a pointer driven by the mouse is associated with the designated VoIP message.

While specific embodiments will be described below with reference to particular circuit or logic configurations, those of skill in the art will realize that embodiments of the present invention may advantageously be implemented with other substantially equivalent configurations.

Figure 1:
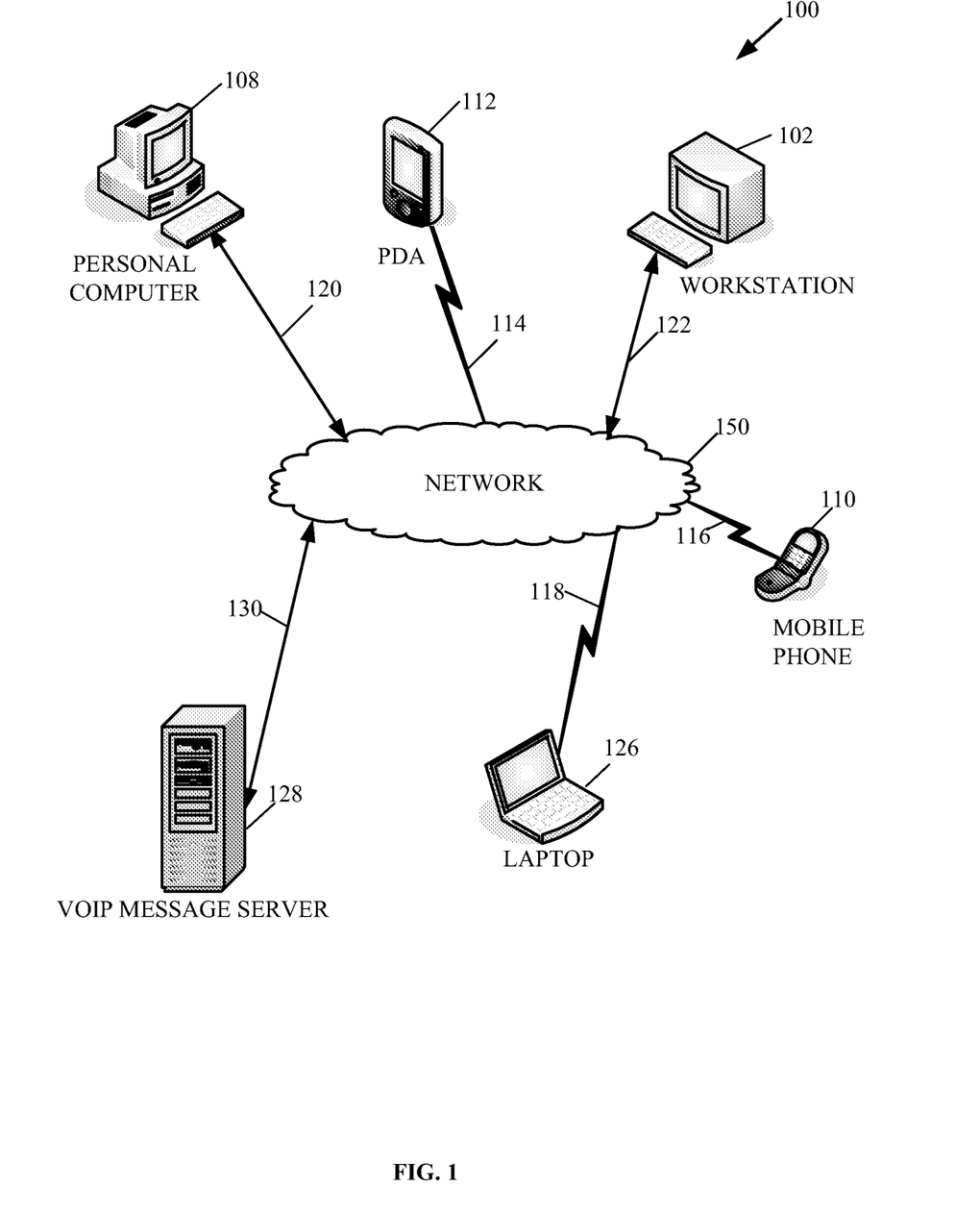
FIG. 1 depicts a network diagram of an embodiment of devices capable of selectively retrieving Voice over Internet Protocol (VoIP) messages.

FIG. 1 depicts a diagram of an embodiment of a networked system 100 of devices capable of selectively retrieving VoIP messages. Networked system 100 may provide for the real-time exchange of speech and other audio over the Internet and other networks. The system 100 includes a network 150, VoIP message server 128 connected to network 150 through wireline connection 130, and a variety of devices capable of selectively retrieving VoIP messages (VoIP devices), including:

workstation 102, a computer coupled to network 150 through wireline connection 122, personal digital assistant 112, coupled to network 150 through wireless connection 114, personal computer 108, coupled to network 150 through wireline connection 120, laptop computer 126, coupled to network 150 through wireless connection 118; and mobile phone 110, coupled to network 150 through wireless connection 116.

Network 150, which may consist of the Internet or another wide area network, a local area network, or a combination of networks, may provide data communications among the VoIP message server 128 and the VoIP devices 102, 108, 112, 126, and 110. VoIP message server 128 may have installed and operative upon it software to transmit VoIP messages across network 150. VoIP message server may receive a request to make a VoIP call. For example, VoIP message server 128 may receive digital data representing a telephone number. VoIP message server 128 may determine that the request to make a VoIP call is in proper format, and may determine an IP address for a recipient or recipients. VoIP message server 128 may connect the device placing the VoIP call with a destination device. A session may then be established between the calling device and the destination device. In some embodiments, VoIP message server 128 may administer VoIP conferences. VoIP conferences include more than two participants. In some embodiments, VoIP message server 128 may administer a chat conference which includes VoIP. A chat conference may be the real-time exchange of text messages among a group of people. In still other embodiments, VoIP messages may be transmitted without a server such as VoIP message server 128.

Users may participate in VoIP conversations through VoIP devices such as devices 102, 108, 112, 126, and 110. In some embodiments, participants in a VoIP conversation may run client software on their VoIP devices. When a participant opens a client, the client may attempt to connect with VoIP message server 128. If the connection is successful, the client may inform the VoIP message server 128 of the participant's Internet Protocol (IP) address, a number identifying the VoIP device, and the number of a port assigned to the client. In other embodiments, a participant may visit a web site to participate in a VoIP call. No client software may reside on the participant's VoIP device. In some embodiments, a VoIP message may be transmitted across the network 150 to the VoIP message server 128 and may be relayed to the other participants by VoIP message server 128. In other embodiments, the VoIP message may be transmitted from one participant to others without being relayed through the VoIP message server 128. A client running on a participant's VoIP device may have obtained connection information such as IP addresses and ports from the VoIP message server 128. The VoIP messages may be sent under a variety of protocols, or methods for bundling up the digital content and transmitting the digital content across network 150. When a client sending a VoIP message sends it by a protocol understood by the client receiving the message, the receiving client may understand the format of the VoIP message and the manner in which the VoIP message was sent across the network 150, and may be able to properly process it. Protocols for transmitting VoIP across a network such as network 150 include H.323, a standard created for multimedia data including audio and video by the International Telecommunication Union (ITU); Media Gateway Control Protocol (MGCP); and Session Initiation Protocol (SIP).

The arrangement of the server and other devices making up the exemplary system illustrated in FIG. 1 is for explanation, not for limitation. Data processing systems useful according to various embodiments of the present invention may omit a server, or may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
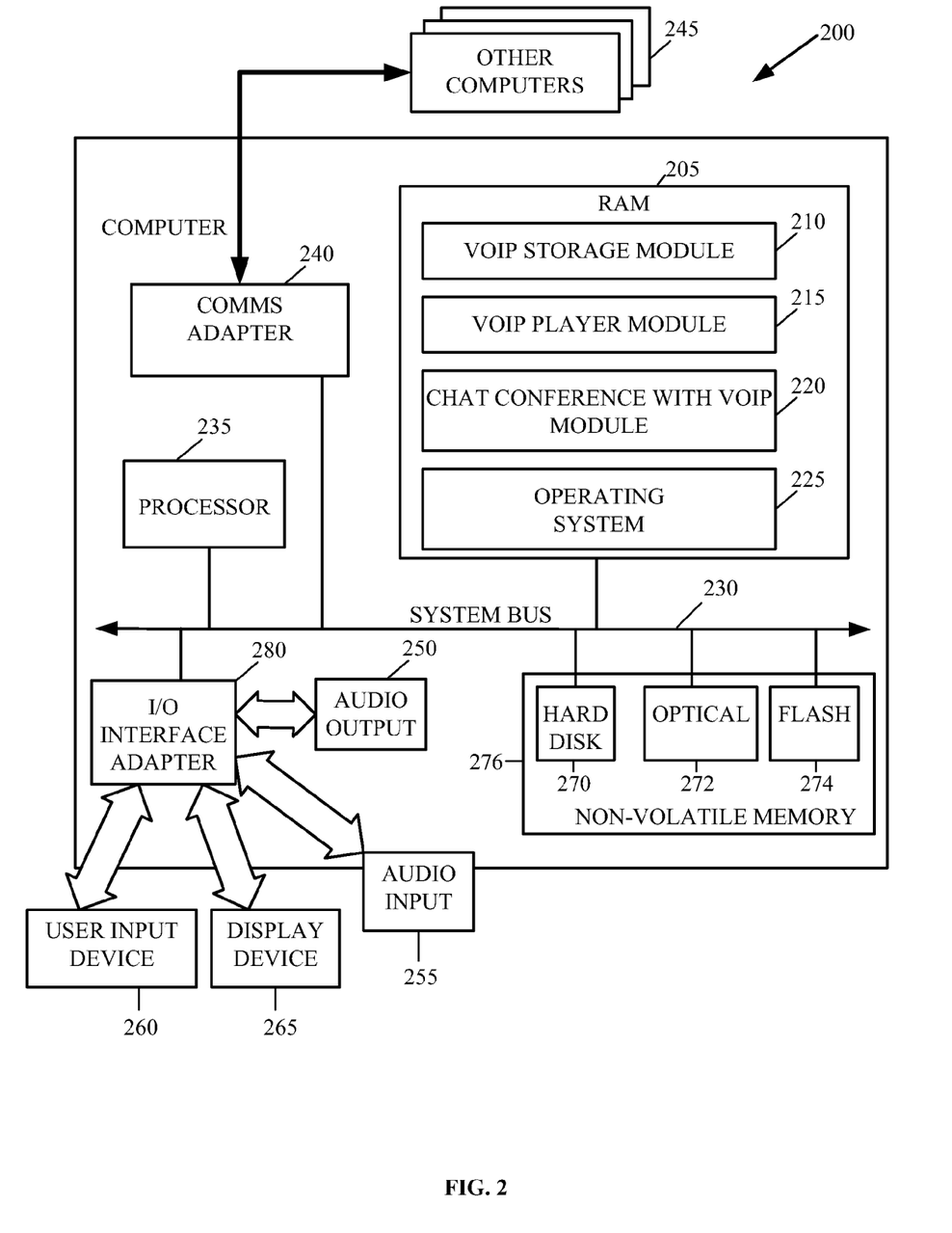
FIG. 2 depicts an embodiment of a computer capable of selectively retrieving VoIP messages.

Turning to FIG. 2, depicted is an embodiment of a computer 200 capable of selectively retrieving VoIP messages that includes random access memory (RAM) 205, a processor 235 or CPU, non-volatile memory 276, a communications adapter 240, and an Input/Output (I/O) interface adapter 280 connected by system bus 230. Stored in RAM 205 is a VoIP storage module 210, a VoIP player module 215, a chat conference with VoIP module 220, and an operating system 225. VoIP storage module 210 may comprise computer program instructions for storing a plurality of VoIP messages. The VoIP messages may be stored in RAM 205, in non-volatile memory 276, or in removable drives or media not shown. The computer program instructions of VoIP storage module 210 may also associate descriptors with the stored VoIP messages. VoIP storage module 210 may retrieve a stored VoIP message based upon a designation of the VoIP message. VoIP player module 215 may comprise computer program instructions to play VoIP messages. Chat conference with VoIP module 220 may comprise computer program instructions to receive text from participants in a chat conference, display the text on display device 265, receive text through user input device 260, and transmit the text to other participants in the chat conference. Chat conference with VoIP module 220 may also receive VoIP messages from conference participants and may transmit them to other participants in a chat conference with VoIP. Operating system 225 may comprise UNIX™, Linux™, Microsoft Windows™, AIX™, IBM's i5/OS™, or other operating systems useful for selectively retrieving VoIP messages as will occur to those of skill in the art. VoIP storage module 210, VoIP player module 215, chat conference with VoIP module 220, and operating system 225 (components of software) are shown in RAM 110 in FIG. 1, but many components of such software may be stored in non-volatile memory 276 also. Further, while the components of such are shown simultaneously present in RAM, in other embodiments, only some of the components of RAM 205 may be present at any given time.

I/O interface adapter 280 implements user-oriented I/O through, for example, software drivers and computer hardware for controlling output to display devices such as display device 265 and audio output device 250 as well as user input from user input device 260 and audio input 255. User input device 260 may include both a keyboard and a mouse. Some embodiments may include other user input devices such as speech interpreters, bar code scanners text scanners, tablets, touch screens, and/or other forms of user input devices. Audio output 250 may include speakers or headphones and audio input 255 may include a microphone or other device to capture sound. Non-volatile computer memory 276 may be implemented as a hard disk drive 270, optical disk drive 272, electrically erasable programmable read-only memory space (EEPROM or Flash memory) 274, RAM drives (not shown), or as any other kind of computer memory as will occur to those of skill in the art.

Communications adapter 240 may implement the hardware level of data communications through which one computer sends data communications to other computers, such as other computers 245, directly or through a network. Such data communications may be carried out through serially through RS-232 connections, through external buses such as USB, through data communications networks such as IP networks, and in other ways as will occur to those of skill in the art. Examples of communications adapters include modems for wired dial-up communications, Ethernet (IEEE 802.3) adapters for wired network communications, and 802.11b adapters for wireless network communications.

The computer and components illustrated in FIG. 2 are for explanation, not for limitation. In other embodiments, embedded systems, PDAs, cell phones, and other network-enabled devices which may transmit, receive, and store VoIP messages may selectively retrieve VoIP messages. In other embodiments, a chat conference module may be separate from a VoIP module or may be omitted. In other embodiments, a VoIP storage module may be implemented in hardware, firmware, or in state machines or may form a component of an operating system.

Figure 3:
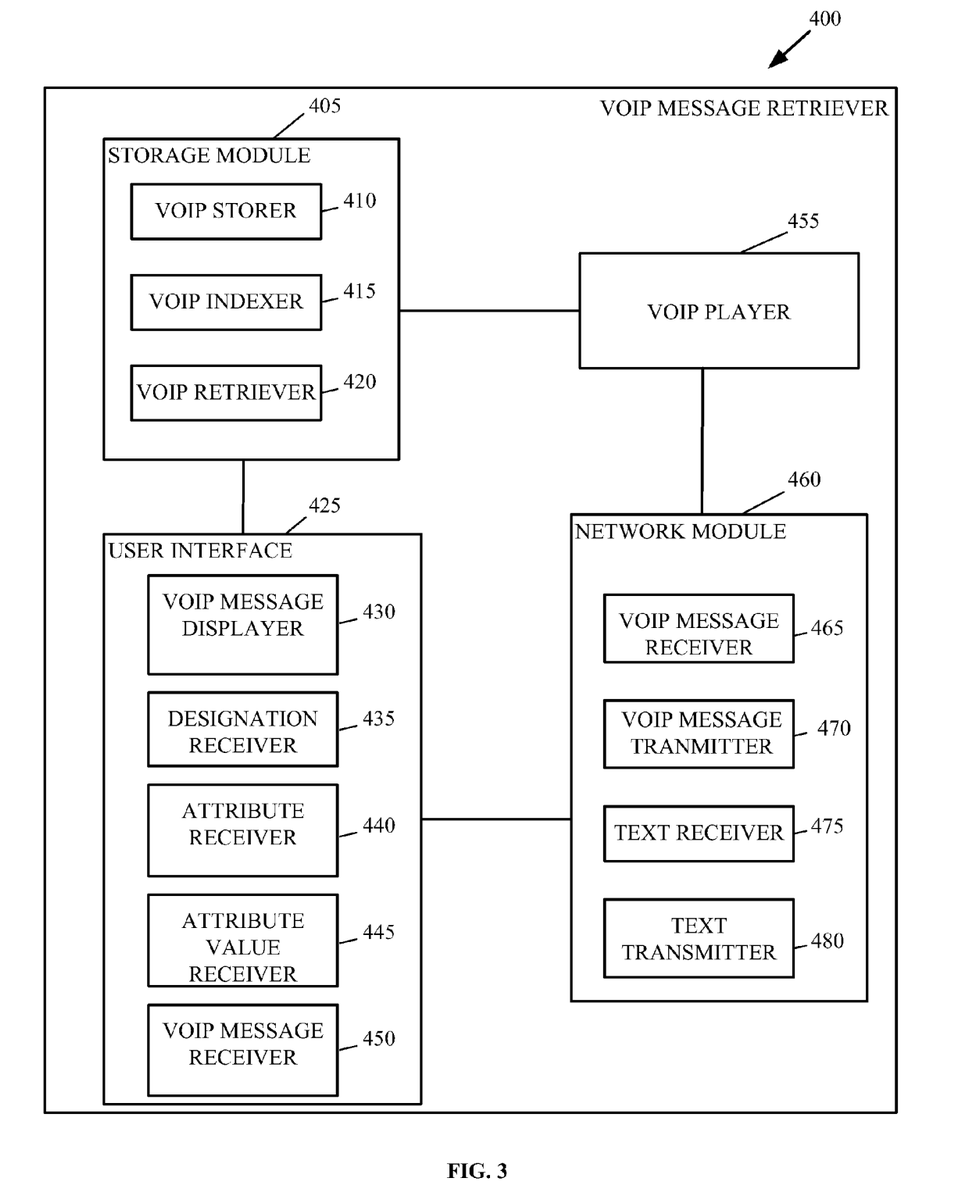
FIG. 3 depicts an embodiment of a VoIP message retriever.

Turning to FIG. 3, depicted is an embodiment of a VoIP message retriever 400 that includes a storage module 405, a user interface 425, a VoIP player 455, and a network module 460. The storage module 405 is an apparatus for selectively storing VoIP messages, associating descriptors with the VoIP messages, and retrieving the VoIP messages. It includes VoIP storer 410 to store VoIP messages, VoIP indexer 415 to associate descriptors with VoIP messages, and VoIP retriever 420 to retrieve VoIP messages. VoIP storer 410 may store VoIP messages from two-party conversations, from VoIP conferences, and from chat conferences which include VoIP communications. VoIP storer 410 may store VoIP messages received during VoIP calls, VoIP messages sent during VoIP calls, and VoIP messages that were received apart from a VoIP conversation. In some embodiments, VoIP storer 410 may temporarily store VoIP messages received during a VoIP conference or a chat conference with VoIP.

After the conference, a participant may select VoIP messages to retain. In other embodiments, after each VoIP message from a conference session is played, VoIP storer 410 may ask the participant whether to retain the VoIP message. In further embodiments, the default may be to delete a VoIP message. A VoIP message may be deleted unless VoIP storer 410 receives specific instructions to retain the message.

In some embodiments, VoIP storer 410 more store data other than VoIP messages. For example, a VoIP storer 410 of a VoIP message retriever that participates in chat conferences with VoIP may store the chat messages as well as the VoIP messages transmitted during the chat conference. As another example, a VoIP storer may store a log of VoIP messages. For example, the log may indicate the topics of messages and their arrival time. The log may also include attributes of text messages, or may include the actual text of the text messages. The log may include VoIP messages that are deleted. As another example, a VoIP storer may store a transcript of a VoIP message. The transcript may be made by a recipient of the VoIP message.

VoIP indexer 415 associates descriptors with the stored VoIP messages. The descriptors may comprise values of attributes. The attributes of a VoIP message may include names of participants, a title of the VoIP message, a length of the VoIP message, a date and time of the VoIP message, a subject of the VoIP message, a security status of the VoIP message, an expiration date of the VoIP message, and a session host for the VoIP message. The security status of a VoIP message may indicate a list or class of permissible recipients of the VoIP message. For example, it may indicate that the VoIP message may be disclosed only to upper management, or that the VoIP message was confidential.

The security status of a VoIP message may also indicate desired methods for securing the VoIP message. For example, the security status may indicate that the VoIP message should be stored in encrypted form, or that providing a password may be required to access the VoIP message.

In further embodiments, the security status of a VoIP message may indicate restrictions on publishing the message, such as that the message was copyrighted by user. The expiration date may govern the length of time a VoIP message is retained by VoIP storer 410. VoIP storer 410 may delete a VoIP message after the passage of an expiration date of the VoIP message. In some embodiments, VoIP storer 410 may first query a user before deleting the expired VoIP message. An attribute of a VoIP message produced as part of a conference, such as a VoIP conference or a chat conference with VoIP, may include a name, title, or topic of the conference.

VoIP retriever 420 may receive a designation of the VoIP message. The designation may be received through the designation receiver 435 of the user interface 425. In some embodiments, VoIP retriever 420 may receive a value or values of attributes of VoIP messages and may search through stored VoIP messages or displayed VoIP messages for a VoIP message or messages with the same or similar values of attributes. A retrieved VoIP message may be played by VoIP player 455 or may be forwarded to others.

User interface 425 includes VoIP message displayer 430, designation receiver 435, attribute receiver 440, attribute value receiver 445, and VoIP message receiver 450. User interface 425 is an apparatus for receiving input concerning VoIP messages from a user and providing output to the user. VoIP message displayer 430 may display some of the VoIP messages stored by VoIP storer 415. In some embodiments, VoIP message displayer 430 may also display VoIP messages before storage by VoIP storer 410. For example, VoIP message displayer 430 may display messages received during a VoIP conference to enable a user to decide which of the messages to retain. VoIP message displayer 430 may display messages after user interface 425 receives a user command. For example, user interface 425 may interpret a mouse click, such as a right mouse click, as a command to display VoIP messages. The display may include descriptors of the displayed VoIP messages. In further embodiments, the descriptors may include values of attributes of the displayed VoIP messages. In some embodiments, a user may edit the displayed descriptors of a VoIP message.

Designation receiver 435 is an apparatus to receive a designation of a stored VoIP message from a user. In some embodiments, the designation may consist of a mouse click when the pointer of the mouse is over a descriptor of a VoIP message. In some embodiments, the designation may consist of values of attributes of stored VoIP messages. For example, a user may type values of attributes into a window to enable a search of the stored VoIP messages for VoIP messages with those attribute values or similar attribute values. In some embodiments, user interface 425 may receive further mouse inputs from a user to command the replaying or forwarding of the retrieved VoIP message. For example, a user's right click after designating a VoIP message or portion of a VoIP message may bring up an option such as 'copy' or 'load'. The use may then command the replaying or forwarding of the VoIP message. In some embodiments, further mouse inputs may designate recipients for forwarding the retrieved VoIP message. The user may click on names of recipients for the retrieved VoIP message or portion. In some embodiments, the names of recipients may include the names of participants in a VoIP conference or chat conference with VoIP. The user may then click 'forward' to send the retrieved VoIP message or portion.

VoIP attribute receiver 440 is an apparatus to receive from a user a list of attributes for the display of VoIP messages. Values for the attributes in the list of attributes may be included in the displays of VoIP messages by VoIP message displayer 430. Attribute value receiver 445 is an apparatus to receive values of attributes from a user. User interface 425 may present to a user a menu of attributes after a user has requested the storing of a VoIP message. Attribute value receiver 445 may receive the values of attributes from the user. In some embodiments, user interface 425 may fill in default values for attributes if a user does not supply values. VoIP message receiver 450 is an apparatus to receive audio from a user for storage or transmission across a network as a VoIP message. VoIP message receiver 450 may capture sound produced by a participant and transform the sound into digital form for transmission across a network. VoIP player 455 is an apparatus for playing VoIP messages. VoIP player 455 may replay VoIP messages retrieved from storage module 405.

Network module 460 includes VoIP message receiver 465, VoIP message transmitter 470, text receiver 475, and text transmitter 480. Network module 460 may send and receive VoIP messages and text messages across a network such as network 150 in FIG. 1. VoIP message receiver 465 may receive VoIP messages transmitted across a network. VoIP message transmitter 470 may transmit VoIP messages across a network. The VoIP messages may have been received by VoIP message receiver 465 or retrieved by VoIP retriever 420. VoIP message receiver 465 and VoIP message transmitter 470 may, for example, include some of the components of the system of FIG. 4 and may perform some of the functions of the system of FIG. 4. Text receiver 475 may receive text messages generated during a chat conference with VoIP across a network and text transmitter 480 may transmit chat messages generated during the chat conference.

The voice message retriever 400 may enable the organizing and managing of stored VoIP messages and may allow those stored VoIP messages to be easily manipulated and forwarded to other users. The associating of attributes with the VoIP messages may enable the efficient ordering and retrieval of the messages by attribute values. Similarly, the display of the messages by attribute values may enable the efficient retrieval of the messages.

FIG. 3 is for illustration and not limitation. In some embodiments, retrieved VoIP messages may be forwarded by means other than a VoIP message transmitter. For example, a stored VoIP message can be written to a CD and the CD mailed to a recipient. In alternative embodiments, network module 460 may send and receive only VoIP messages and not text messages. In alternative embodiments, a network module may omit a text receiver or a text transmitter. In alternative embodiments, a network module may handle only two-person VoIP conversations, not VoIP conferences. In alternative embodiments, network module 460 may send and receive only two-party VoIP messages but not VoIP conference calls.

Figure 4:
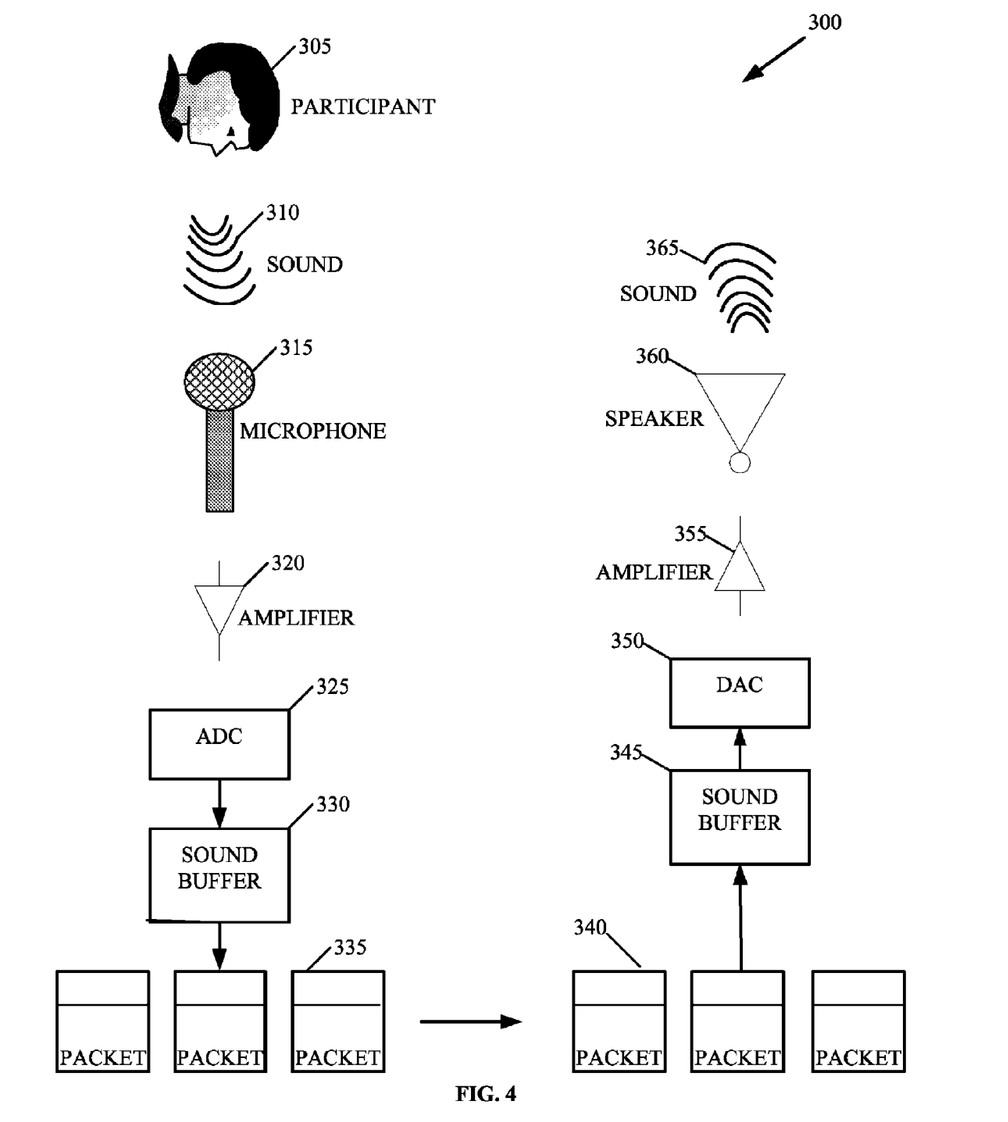
FIG. 4 depicts an embodiment of a system to transmit sound over a network.

FIG. 4 depicts an embodiment of a system 300 to transmit sound across a network. System 300 may store VoIP messages, associate one or more descriptors with the VoIP messages, and display at least some of the VoIP messages. The display may include one or more of the descriptors associated with the displayed VoIP messages. System 300 may further receive a designation of a designated VoIP message from the VoIP messages. System 300 may further retrieve the designated VoIP message. System 300 may further transmit the designated VoIP message across a network.

System 300 includes a microphone 315, two amplifiers 320 and 355, an analog to digital converter 325, a digital to audio converter 350, two sound buffers 330 and 345, and sound packets 335 and 340. A participant 305 in a VoIP call may produce sound 310, for example, by speaking. The sound may also be non-verbal. In alternative embodiments, the sound may be produced by an agency other than a participant. Microphone 315 may convert the sound waves constituting sound 310 into electrical signals. The sound waves may produce vibrations in a diaphragm, a thin plate contained in the microphone; and the vibrations of the diaphragm may induce electrical signals. In some embodiments, the microphone 315 may be a component of a VoIP device, such as a built-in microphone in a computer or a cell phone. In alternative embodiments, the microphone may plug into the VoIP device. For instance, a microphone jack may plug into a computer. Amplifier 320 boosts or increases the strength of the electrical signals produced by the microphone.

The signal then proceeds to an analog to digital converter (ADC) 325, which converts the electrical waves to digital form. ADC 325 may measure the electrical signals produced by the microphone at a predetermined frequency ('sample' the signals) and may represent the waveform amplitude at a given point in time as a binary number by dividing the possible values of the amplitude into ranges and representing each range with a binary number. For example, an ADC that encodes the interval as an 8-bit number may divide the amplitude of waves into 256 ranges. For each sample, the ADC 325 may determine the range in which the wave amplitude falls. The 8-bit ADC may find that successive amplitudes fall into the range of 128, 135, and 180 in successive samples. The ADC may return the numbers 128, 135, and 180 as the value of those samples. Similarly, if the amplitude is encoded as a 16 bit number, representation as one of 65,566 amplitude values would be possible. Choosing a different number of bits in this way can improve the amplitude precision as more bits are used, at the cost of transmitting more data.

The sampling rate may depend upon the protocol used for the transmission of sound across a network. Common protocols include the G.711, G.722 and G.720 protocols, audio components of the H.323 protocol suite promulgated by the International Communication Union for video conference. Under the G.711 protocol, sampling occurs 64,000 times per second (64 kHz). Under the G.729A protocol, sampling occurs at 8 kHz. This protocol is the most commonly used by Voice over Internet Protocol (VoIP) systems. The sampling rate of 8 kHz provides a good compromise between sound quality and bandwidth efficiency. In contrast, typical CD recordings may sample at the rate of 44.1 kHz. A computer sound card may contain an ADC.

The sampling of the electrical signal produced by microphone 315 may generate a large amount of data. At a resolution of 16 bits and a sampling rate of 48 kHz, an ADC may produce roughly six megabytes of data per minute. The data produced by ADC 325 may be stored in sound buffer 330 for further processing. The data may be copied from sound buffer 330 to other storage for later retrieval. For example, VoIP messages may be moved from sound buffer 330 to more permanent storage for later retrieval. As a further example, a VoIP message relayed through a computer may be stored for later retrieval in the memory of the computer.

The data in sound buffer 330 may be transmitted across a network. The data may be transmitted uncompressed or may be compressed for more efficient transmission. Uncompressed sound data may be represented as WAV files. A WAV file may include a small header with information about size, sample rate, and other facts. The remainder of the file may consist of digital numbers representing the magnitude of the sound waves at the sampling points. Methods of compression include MPEG, layer three of a standard developed by the Moving Picture Experts Group for the compression of audiodigital information. Compression may reduce the size of data by a factor of 10 or more.

The data, compressed or not, is then divided into packets 335 or small pieces of information for transmission over the internet. The packets contain the actual sound data and other information, such as the source and destination internet addresses, information about the protocols being followed for transmission, information about the format of the sound data file, and information for reassembling the packets. In addition to H.323, other protocols commonly used for the transmission of audio include the Session Initiation Protocol, a protocol designed especially for VoIP, and Media Gateway Control Protocol. Other protocols can be used for transmitting VoIP calls. In particular, proprietary protocols may be used during VoIP conferences, since all participants may use the same conference software.

The packets 335 may be transmitted across the internet to a network device of a recipient. There, the packets may be converted to sound by a process which is roughly the reverse of the process of transforming sound into packets. The arriving packets 340 are stored in a sound buffer 345. The sound buffer 345 may gather packets until the entire data from a transmission has been collected. Alternatively, the sound buffer 345 may gather enough packets to produce sound for a certain duration, and then pass on the packets for transformation into sound and playing the sound while additional packets continue to gather. This process of playing a portion of the sound while packets containing other portions of the sound are still arriving is called "streaming." The packets 340 are assembled into an uncompressed digital sound file and sent to the DAC converter 350, which converts the digital files into analog electrical waves. Computer sound cards frequently contain a DAC converter. The waves are amplified by amplifier 355 and sent through speaker 360 to produce sound 365. If the fidelity of system 300 is good, sound 365 may be very similar to sound 310. Even in relatively low-fidelity systems, when sound 310 is speech, sound 365 may be recognizable as the speech that produced sound 310.

Figure 5:
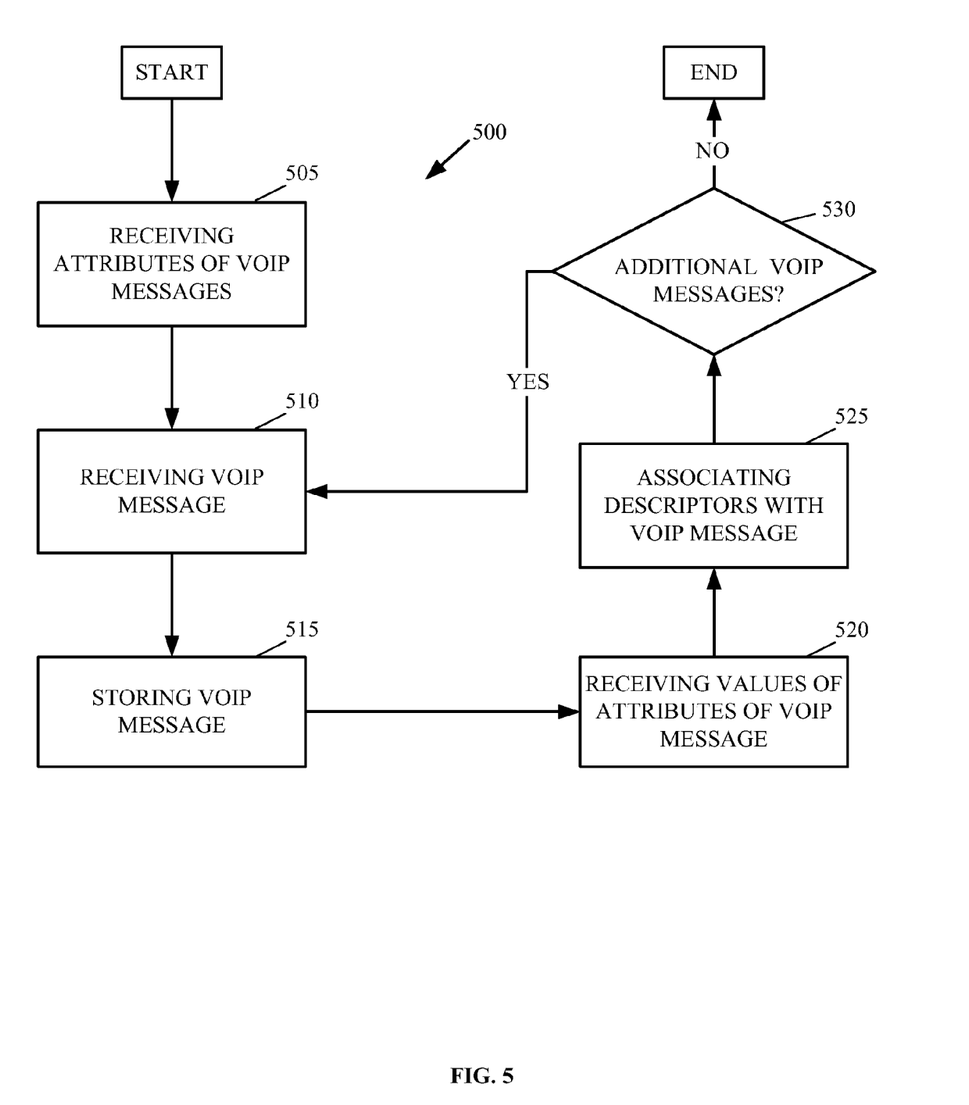
FIG. 5 depicts a flowchart of an embodiment to store VoIP messages and to associate descriptors with the VoIP messages.
Figure 6:
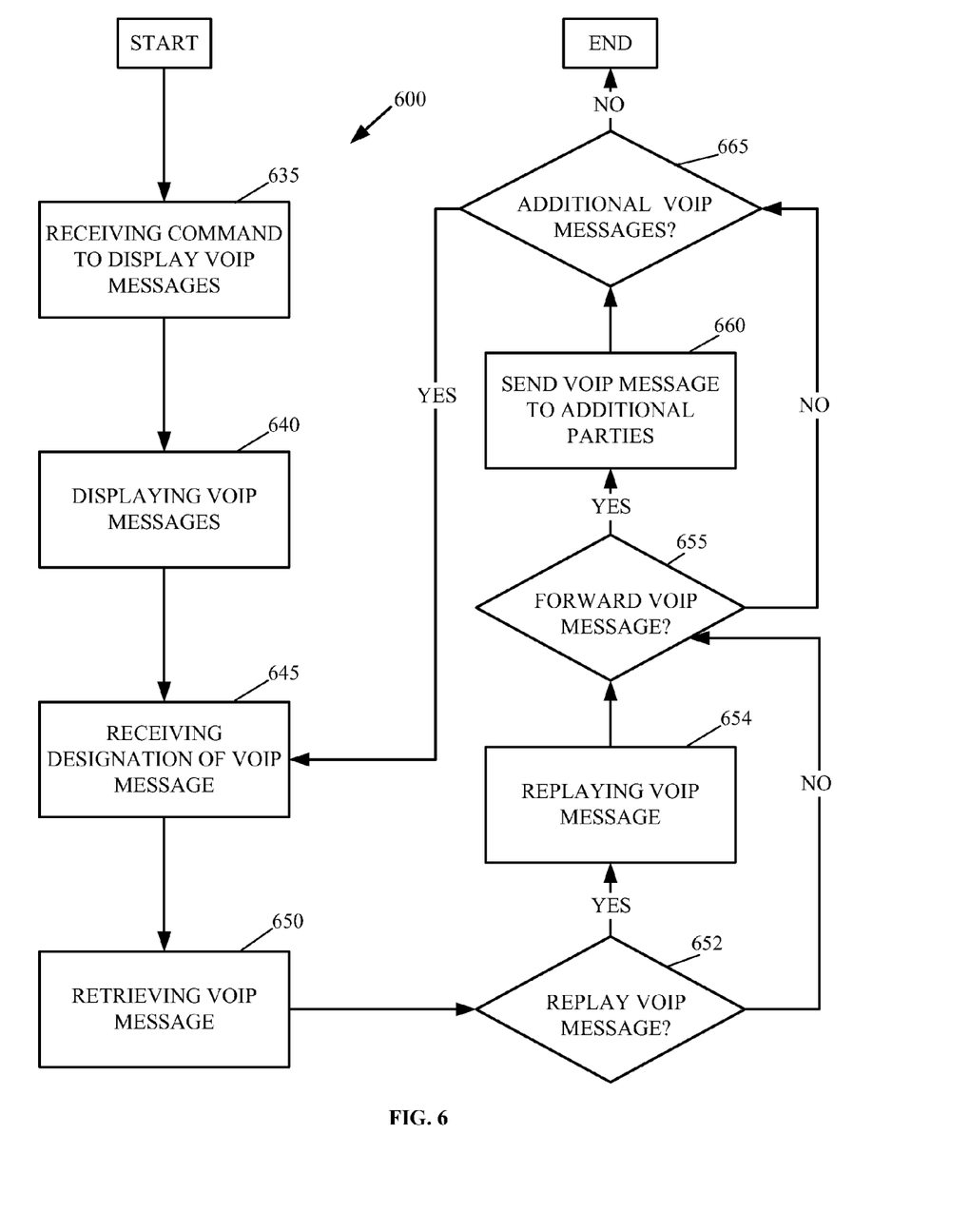
FIG. 6 depicts a flowchart of an embodiment to selectively retrieve VoIP messages.

FIG. 5 and FIG. 6 depict flowcharts of an embodiment to store VoIP messages, associate attributes with the VoIP messages, display the messages, and retrieve the messages. Flowchart 500 of FIG. 5 begins with receiving attributes of VoIP messages (element 505). The attributes constitute categories for indexing and displaying VoIP messages. The attributes of a VoIP message may, for example, include the date of the VoIP message, the participants, the length, and the subject matter. The attributes may be received by a VoIP message retriever such as that illustrated in FIG. 3. The VoIP message retriever may also receive a VoIP message (element 510). The VoIP message may be received across a network during a VoIP conversation, it may be received from a local user for transmission during a VoIP conversation, and it may be received as an audio file not part of a VoIP conversation.

The received VoIP message may be stored (element 515). A VoIP message retriever may provide a user an option of storing a VoIP message immediately after it has been played. Messages not saved may be discarded immediately or at the end of a VoIP session. Alternatively, the apparatus may temporarily save all VoIP messages until the end of a session. The apparatus may then query a user as to which, if any, VoIP messages to store. Flowchart 500 may also include receiving the values of the attributes through a user interface (element 520). Default values may be supplied if values are not received through the user interface. Flowchart 500 may also include associating descriptors with the VoIP message (element 525). The descriptors may provide information about the VoIP message. The descriptors may consist of the values of the attributes. If there are additional VoIP messages to receive (element 530), each element of flowchart 500 from element 510 to element 525 may be repeated. Otherwise, the storing of VoIP messages and the associating of descriptors with the VoIP messages may end.

FIG. 6 depicts a flowchart of an embodiment to selectively retrieve VoIP messages. Flowchart 600 begins with receiving a command to display stored VoIP messages (element 635). The VoIP messages may have been stored and associated with descriptors by a process such as illustrated in flowchart 600. A VoIP message retriever such as illustrated in FIG. 3 may receive a command to display VoIP messages (element 635). The command may consist of a change in state in a mouse button, such as a right click. The VoIP message retriever may display the VoIP messages (element 640) by, for example, generating a window containing descriptors of some of the stored VoIP messages. For example, the window may display the values of attributes of some or all of the stored VoIP messages. The VoIP message retriever may further receive a designation of a VoIP message (element 645). The designation may consist of a mouse click when the pointer associated with the mouse is over a display of one of the VoIP messages. Alternatively, the designation may consist of a description of a VoIP message, such as values of attributes of a VoIP message. A user may, for example, request the retrieval of a VoIP message with a designated date and designated participants.

The VoIP message retriever may retrieve the designated VoIP message (element 650). The VoIP message retriever may further determine whether to replay the VoIP message for the user (element 652). In some embodiments, the VoIP message retriever may ask the user whether to replay the message. In other embodiments, the user may initiate a command to replay the message. If the user requests the replaying of the retrieved VoIP message, the VoIP message may be replayed (element 654). In alternative embodiments, a retrieved VoIP message may be automatically replayed without an explicit request from a user.

The VoIP message retriever may determine whether to forward the retrieved VoIP message (element 655) and may forward the VoIP message to one or more recipients (element 660). The VoIP message retriever may establish a VoIP connection and forward the retrieved VoIP message as part of a VoIP conversation. Alternatively, the VoIP message may be forwarded separately from a VoIP conversation. For example, the VoIP message may be sent as a sound file attachment to an email. In some embodiments, the VoIP message retriever may automatically replay retrieved VoIP messages.

In some embodiments, a portion of the retrieved message may be forwarded. For example, a user may listen to the playing of the retrieved VoIP message, pause at the point where a sub-session is to begin, right click on a mouse, and select a 'begin sub-session' option. The user may resume the playing of the retrieved VoIP message. The user may pause the play of the retrieved VoIP message at the end of the desired sub-session. The user may then right click the mouse to designate the end of the sub-session and to command the forwarding of the sub-session.

As another example, a user may indicate a sub-session by providing start and end information for the sub-session, such as elapsed time or numeric counter. As another example, a user may select a portion of a VoIP message visually, using an icon that represents places within a VoIP message. If there are additional VoIP messages to receive, each element of flowchart 700 from element 645 to element 660 may be repeated. Otherwise, the selective retrieving of VoIP messages may end.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product for requesting permission to record VoIP messages accessible from a computer-usable or computer-readable medium providing program code for use by or in connection with a computer or any instruction execution system. For the purposes of this description, a computer-usable or computer readable medium can be any apparatus that can, store, the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks, Modems, cable modem and Ethernet cards are just a few of the currently available types of network adapters.

It will be apparent to those skilled in the art having the benefit of this disclosure that the present invention contemplates methods and arrangements to selectively retrieve VoIP messages. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to selectively retrieve Voice over Internet Protocol (VoIP) messages, the method comprising:
   storing the VoIP messages;
   associating one or more descriptors with the stored VoIP messages;
   displaying at least some of the VoIP messages and one or more of the descriptors associated with the displayed VoIP messages, wherein a descriptor in the one or more descriptors comprises a security status of an associated VoIP message from the displayed VoIP messages;
   receiving a designation, the designation indicating a designated VoIP message from the displayed VoIP messages; and
   retrieving the designated VoIP message, the retrieving comprising:
      matching the designation with one or more stored values corresponding to the one or more descriptors of the displayed VoIP messages;
      determining that none of the stored values exactly matches the designation; and
      retrieving a VoIP message associated with a descriptor whose value is similar to the designation, the retrieved VoIP message being the designated VoIP message.

2. The method of claim 1, further comprising:
   forwarding the designated VoIP message.

3. The method of claim 2, wherein forwarding the designated VoIP message comprises:
   selecting a portion of the designated VoIP message; and
   forwarding the selected portion of the designated VoIP message.

4. The method of claim 1, wherein the storing comprises storing VoIP messages originating within chat conferences.

5. The method of claim 4, wherein the storing comprises storing text from the chat conferences.

6. The method of claim 1, wherein the associating comprises:
   presenting an attribute via a user interface;
   receiving a value associated with the attribute via the user interface; and
   associating the value with one of the stored VoIP messages, wherein the security status indicates a restriction on publishing the associated VoIP message.

7. The method of claim 6, wherein the presenting comprises presenting an attribute selected via the user interface.

8. The method of claim 1, wherein:
   the displaying comprises receiving a first change in state of a button on a mouse; and
   the receiving comprises receiving a second change in state of a button on a mouse while a location of a pointer driven by the mouse is associated with the designated VoIP message.

9. A computer system to selectively retrieve Voice over Internet Protocol (VoIP) messages, the computer system comprising one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to receive VoIP messages;

program instructions to store the VoIP messages;

program instructions to associate one or more descriptors with the VoIP messages;

program instructions to display at least some of the VoIP messages and one or more descriptors associated with the displayed VoIP messages, wherein a descriptor in the one or more descriptors comprises a security status of an associated VoIP message from the displayed VoIP messages;

program instructions to receive a designation, the designation indicating a designated VoIP message from the displayed VoIP messages; and program instructions to retrieve the designated VoIP message, wherein the program instructions to retrieve the designated VoIP message comprise:

program instructions to match the designation with one or more stored values corresponding to the one or more descriptors of the displayed VoIP messages;

program instructions to determine that none of the stored values matches the designation exactly; and program instructions to retrieve a VoIP message associated with a descriptor whose value is similar to the designation, the VoIP message forming the designated VoIP message.

10. The computer system of claim 9 further comprising:

program instructions, stored on at least one of the one or more storage devices for execution by at least one of the one or more processors via at least one of the one or more memories, to forward the designated VoIP message.

11. The computer system of claim 9, further comprising:

program instructions, stored on at least one of the one or more storage devices for execution by at least one of the one or more processors via at least one of the one or more memories, to transmit at least some of the VoIP messages to participants of chat conferences;

program instructions, stored on at least one of the one or more storage devices for execution by at least one of the one or more processors via at least one of the one or more memories, to receive at least some of the VoIP messages from the participants of the chat conferences;

program instructions, stored on at least one of the one or more storage devices for execution by at least one of the one or more processors via at least one of the one or more memories, to relay text messages among participants of the chat conferences; and program instructions, stored on at least one of the one or more storage devices for execution by at least one of the one or more processors via at least one of the one or more memories, to present to a participant of a chat conference a list of participants in the chat conference and to receive commands to transmit VoIP messages to designated participants.

12. The computer system of claim 9, further comprising program instructions, stored on at least one of the one or more storage devices for execution by at least one of the one or more processors via at least one of the one or more memories, to:

present an attribute of the stored VoIP messages;

receive a value of the attribute; and associate the value of the attribute with one of the stored VoIP messages, wherein the security status indicates a restriction on publishing the one of the VoIP messages.

13. A non-transitory computer program product comprising:

one or more computer-readable tangible storage devices and program instructions stored on at least one of the one or more storage devices, the program instructions comprising:

program instructions to store VoIP messages;

program instructions to associate one or more descriptors with the VoIP messages;

program instructions to display at least some of the VoIP messages and one or more of the descriptors associated with the displayed VoIP messages, wherein a descriptor in the one or more descriptors comprises a security status of an associated VoIP message from the displayed VoIP messages;

program instructions to receive a designation, the designation indicate a designated VoIP message from the displayed VoIP messages;

program instructions to retrieve the designated VoIP message, wherein the program instructions to retrieve the designated VoIP message comprise:

program instructions to match the designation with one or more stored values corresponding to the one or more descriptors of the displayed VoIP messages;

program instructions to determine that none of the stored values exactly matches the designation; and program instructions to retrieve a VoIP message associated with a descriptor whose value is similar to the designation, the VoIP message being the designated VoIP message.

14. The computer program product of claim 13, further comprising:

program instructions, stored on at least one of the one or more storage devices, to forward the designated VoIP message.

15. The computer program product of claim 13, wherein the program instructions to store the VoIP messages further comprise:

program instructions to store VoIP messages originating within chat conferences.

16. The computer program product of claim 13, wherein the program instructions to associate further comprise:

program instructions to present an attribute via a user interface;

program instructions to receive a value associated with the attribute via the user interface; and program instructions to associate the value with one of the stored VoIP messages, wherein the security status indicates a restriction on publishing the one of the VoIP messages.

17. The computer program product of claim 13, wherein the program instructions to display comprise:

program instructions to receive a first change in state of a button on a mouse; and program instructions to receive a second change in state of a button on a mouse while a location of a pointer driven by the mouse is associated with the designated VoIP message.

* * * * *